United States Patent [19]

Soltermann

[11] 3,939,998

[45] Feb. 24, 1976

[54] VIALS EMPTYING APPARATUS

[75] Inventor: Walter Soltermann, Birsfelden, Switzerland

[73] Assignee: Ciba-Geigy AG, Basel, Switzerland

[22] Filed: Dec. 3, 1974

[21] Appl. No.: 529,106

[30] Foreign Application Priority Data

Dec. 3, 1973 Germany ............................ 2360201

[52] U.S. Cl. .............. 214/302; 53/59 W; 53/381 R; 214/305

[51] Int. Cl.$^{2}$ .................... B65G 65/40; B65B 69/00

[58] Field of Search ............ 214/302, 305; 53/59 W, 53/381 R

[56] References Cited

UNITED STATES PATENTS 3,143,231 8/1964 Guilloteau et al. ................. 214/305

3,682,341 8/1972 Happel ................................ 214/305

*Primary Examiner*—Travis S. McGehee

*Attorney, Agent, or Firm*—Wenderoth, Lind & Ponack

[57] ABSTRACT

Vials containing radioactive waste are emptied before destruction by passing them down a conveyor comprising pairs of spaced discs with aligned recesses in their edges for holding the receptacles, a severing disc extending between the discs to cut the vials in half. The severed parts are then turned to face radially outwardly, and placed on the ends of the arms of a rotating spider. The arms are hollow, and are connected to a source of inert gas, whereby any liquid remaining in the parts in scavenged. The liquid and the severed parts are collected in different containers.

9 Claims, 4 Drawing Figures

VIALS EMPTYING APPARATUS

FIELD OF THE INVENTION

This invention relates to apparatus for emptying disposable receptacles, more particularly vials containing radioactive waste.

BACKGROUND OF THE INVENTION

Large numbers of vials full of samples of radioactive waste, usually liquids, accumulate after the testing thereof. Conventionally, such vials and their contents have been stored in garbage dumps. Increasingly stringent concern for the environment has made dumping unacceptable, and so vials must now be burned. Since the radioactive substances concerned are usually readily combustible, there is a risk of explosion if a large number of vials accumulate; consequently, it is forbidden to burn full vials. The vials must therefore first be emptied and supplied for burning separately from their contents. Conventionally, vials have been emptied manually by removal of the screw cap, a procedure having two disadvantages— relatively low hourly outputs of approximately from 150 to 300 vials per operator, and an ever-present risk for the operator of radioactive contamination.

BROAD DESCRIPTION OF THE INVENTION

According to the invention there is provided an apparatus for emptying disposable receptacles, comprising:

a. conveying means for moving the receptacles past severing means adapted to sever them into a two cup-like or beaker-like parts;

b. a spider which has tubular arms for supporting the cup-like or breaker-like parts from the conveyor and which is rotatable around a substantially horizontal axis, the arms being adapted to be connected to a pressure gas source at least during part of each rotation;

c. means which turn the two parts of each receptacle in the conveying means so that the severed apertures of such parts face towards the spider;

d. means for locating each of the receptacle parts thus turned on to a rising spider arm;

e. means for collecting liquid poured out of the receptacles; and f. separate means for collecting parts of receptacles.

It is possible, using apparatus according to the invention, to increase the number of vials emptied hourly to several times the previous hourly output/operator.

BRIEF DESCRIPTION OF THE DRAWINGS

The invention will be described in greater detail hereinafter, by way of example, with reference to an embodiment shown in the drawings wherein.

DETAILED DESCRIPTION OF THE INVENTION

Figure 1:
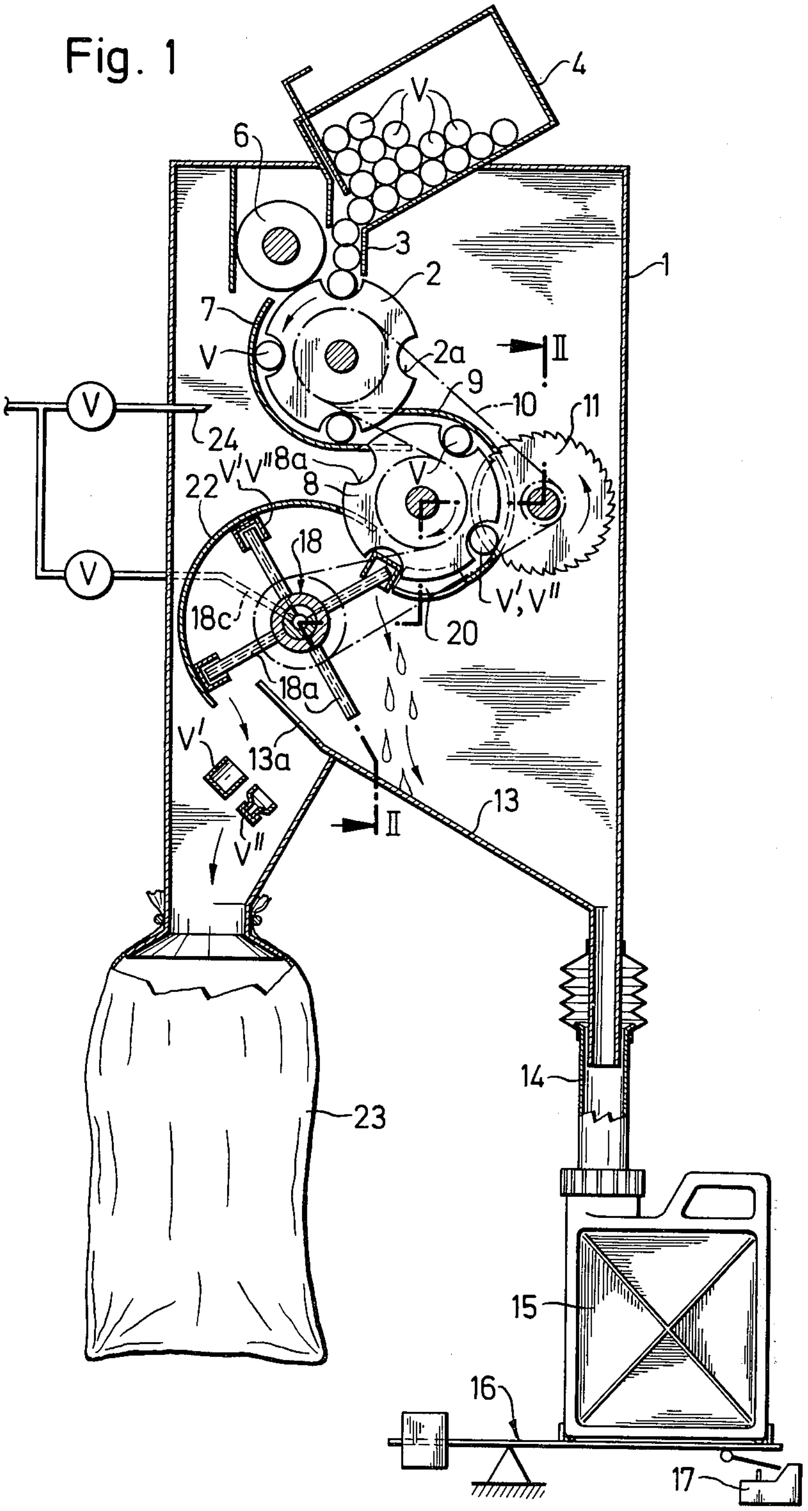
FIG. 1 is a vertical section through a complete apparatus in accordance with the invention.
Figure 2:
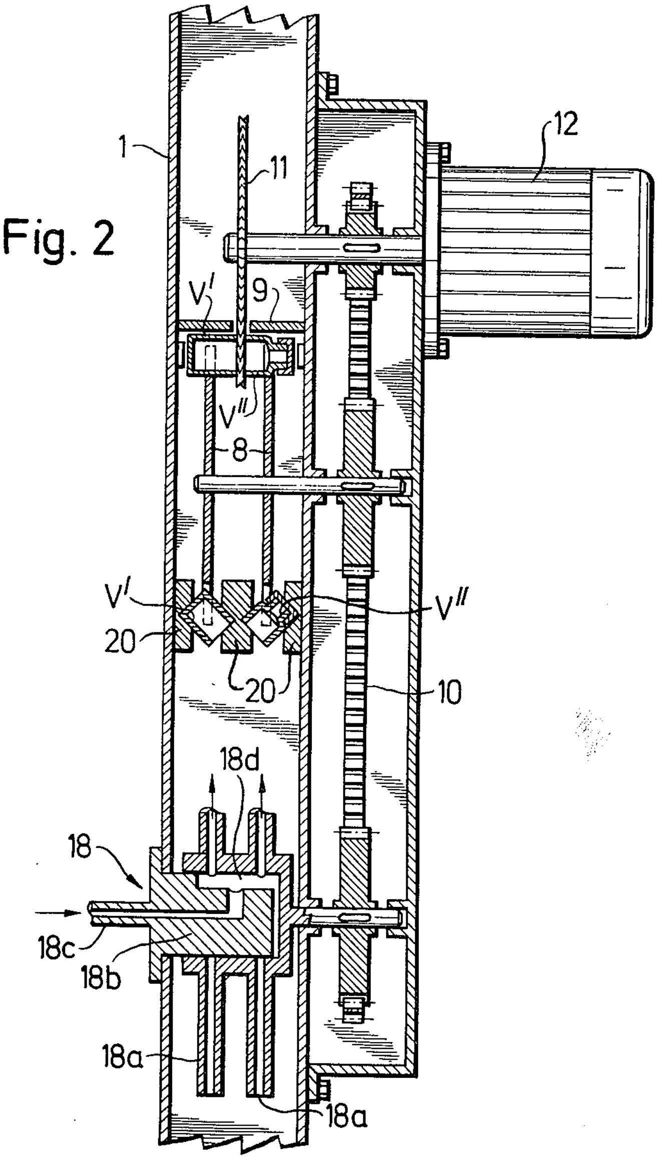
FIG. 2 is a section on the line II—II of FIG. 1.

Referring to FIGS. 1 and 2, there is shown therein an apparatus for emptying vials containing radioactive liquids, comprising a pair of conveying discs 2, mounted in the top part of a casing 1 for rotation around a horizontal axis. The distance between the discs 2 is less than the length of vials V which it is required to empty. The discs 2 are formed on their periphery with uniformly distributed recesses 2*a* which have a part-circular shape corresponding to the cylindrical shape of the vials, so that a vial can be cradled between two recesses opposite one another in the different discs, with its axis parallel to the disc axis. The vials are supplied by way of a feed shaft 3 through which the vials can pass only along the path shown in the drawings. The vials V go from an inclined magazine 4 through shaft 3 to the discs 2 and are conveyed thereby in the direction indicated by an arrow. A roller 6 which engages with the discs 2 immediately downstream of the shaft 3 is mounted for vertical movement and is connected to a control element (not shown) which stops the complete apparatus if a vial is wrongly inserted in the conveying-disc recesses and therefore causes an excessive upwards movement of the roller 6. A guide member 7 prevents the vials from dropping out of the disc recesses. A conveying roller formed with corresponding grooves along its generatrices could be used instead of the disc pair 2, and the recesses need not be part-circular.

Disposed diagonally below the first disc pair 2 and also adapted to rotate around a horizontal axis is a second and similar conveying disc pair 8. A guide plate 9 extends therearound from its highest part to its lowest part. The two disc pairs 2, 8 are driven synchronously by way of a toothed belt 10 which also drives a rotating spider (to be described hereinafter). As shown in FIG. 1, the positions of the two pairs of conveying discs as they rotate are so adapted to one another that the vials which have been conveyed by the first pair of discs are placed in the recesses 8*a* of the second pair of discs and conveyed therein in the direction indicated by an arrow, being retained in the recesses 8*a* in the discs 8 by guide member 9. A circular saw blade 11 is rotatably mounted next to the disc pair 8 approximately at the level of the rotational axis of the discs 8 and extends through an aperture in guide member 9 into the gap between the two discs 8. Blade 11 is mounted on the shaft of an electric motor 12 which also drives the belt 10. The circular saw serves to sever the vials V on the second disc pair 8 into two cup-shaped or beaker-shaped halves V′ and V″, as shown in FIG. 2, most of the contents of the vials discharging upon such severance. An inclined catch plate 13 is therefore disposed below the discs 8 and the liquid discharging from the vials can run down plate 13, through a drain pipe into an outlet spigot 14. The spigot is connected to the pipe by way of bellows or a boot or the like and drains into a collecting vessel or tank 15. The tank 15 stands on a balance 16 adapted to operate a switch 17 when the tank 15 has been filled up to a predetermined weight. When such weight is reached the switch 17 switches off the motor 12.

Of course, a roller formed with an appropriately dimensioned peripheral annular groove and a series of grooves along its generatrices could be used instead of the second pair of conveying discs.

A double spider 18 is disposed diagonally below the second conveying disc pair 8, on the opposite side to the saw 11, and is mounted for rotation about a horizontal axis and is driven via the belt 10 synchronously with the two disc pairs 2, 8. Spider 18 consists of four pairs of radial arms 18*a* at 90° intervals around the hub, i.e. at the same spacing from one another as the recesses in the discs. Each pair of arms 18*a* is parallel, and spaced the same distance apart as the two discs of a conveying-disc pair. The position of spider 18 in rotation relatively to the second disc pair 8 is such that a rising arm 18*a* engages in the recess 8*a* in the corresponding disc 8 when such recess has passed beyond the lowest position of its orbit. This state of affairs is shown diagrammatically in FIG. 1.

So that the two beaker-shaped vial halves can be pushed on to the ends of the spider arms, they must first be turned through an angle of approximately 45° to 90° so that their apertures face substantially radially outwards in relation to the conveying discs. To this end, guides 20 shown in FIGS. 1 and 2 are disposed in the bottom part of the path of the vial parts V′ and V″.

Figure 3:
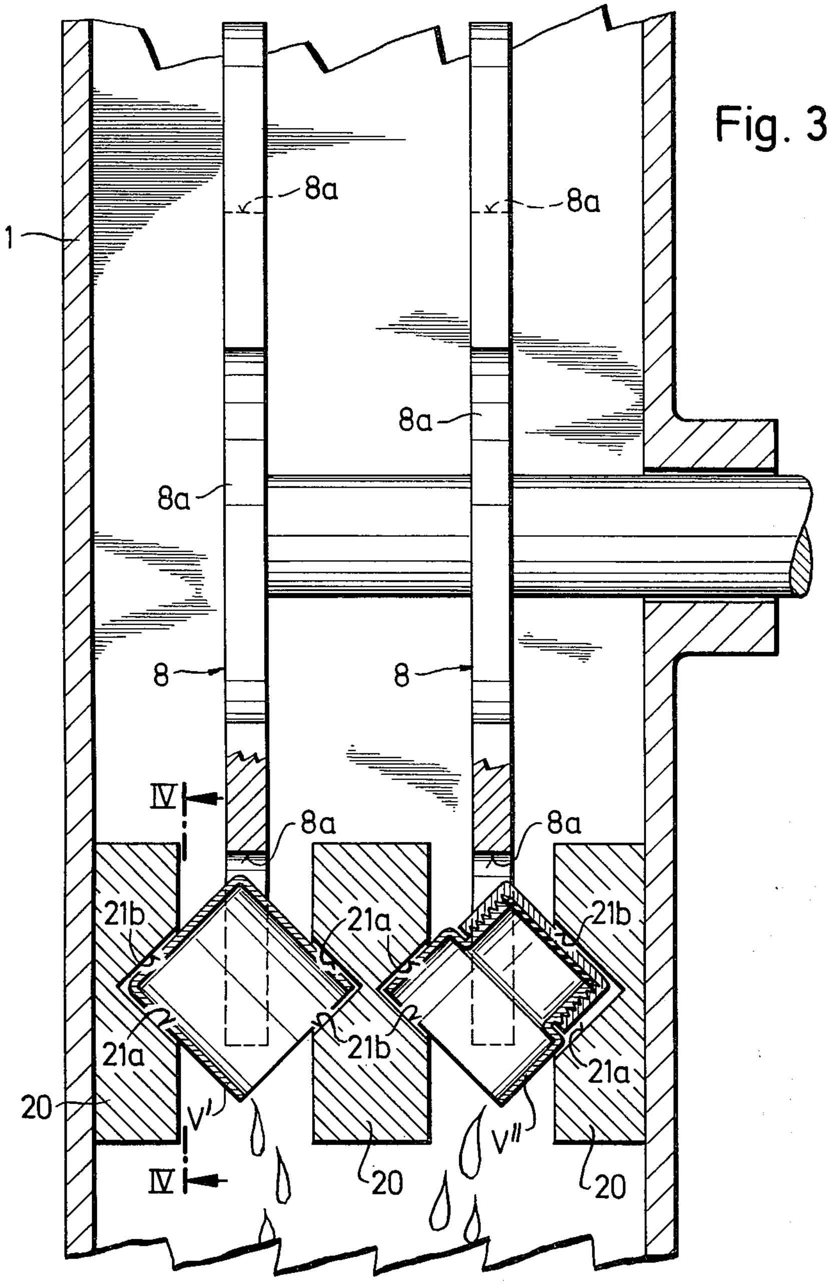
FIG. 3 is a view to an enlarged scale of a variant of part of the apparatus shown in FIGS. 1 and 2.
Figure 4:
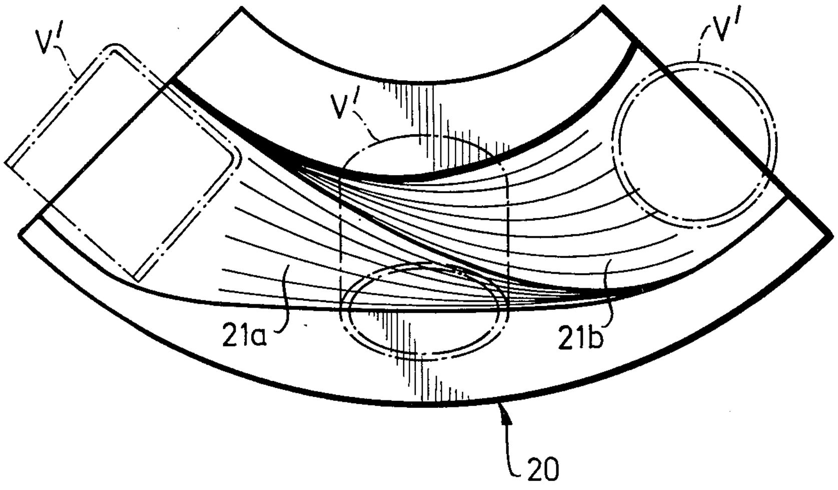
FIG. 4 is a view on the line IV-IV, of FIG. 3.

Alternative guides 20 are shown in FIGS. 3 and 4 and comprise three stationary guide bars 20 which are disposed on both sides of and between the discs 8 and which are in shape arcuate. The bars 20 are formed, in the facing surfaces with recesses each bounded by two sinuously extending guiding surfaces 21*a*, 21*b* which are substantially perpendicular to one another. As considered in the direction of conveyance of the vial parts, the surfaces 21*a* are located initially in planes which are substantially parallel to the axis of the discs 8, and the surfaces 21*b* are perpendicular thereto. In the direction of conveying the guiding surfaces curve sinuously and uniformly through approximately 90° so that at the end the planes of the surfaces 21*a* become perpendicular to the axis of the discs 8, and the planes of the surfaces 21*b* become parallel thereto. One pair each of the surfaces 21*a* engages with the side walls of the two vial parts V′ and V″. The other guiding surfaces 21*b* extend substantially perpendicularly to the surfaces 21*a* — i.e., the planes of the surfaces 21*b* merge from an initial position, in which they are parallel to the discs 8, into a final position, in which they are perpendicular of the discs 8. One pair each of the surfaces 21*b* engage with the orifice edges or base or cover of the vial parts V′, V″. Just a single pair of guiding surfaces 21*a* or 21*b* per guide would of course be sufficient, but the use of two pairs 21*a* and 21*b* improves reliability.

Once the two parts of the vials have passed through the guide 20 (21*a*, 21*b*), they take up the position shown in FIG. 1, are engaged by the rising arms 18*a* of spider 18 and conveyed through a guide member 22. The spider hub 18*b* is hollow and communicates via a line 18*c* with a nitrogen source. The arms 18*a* are also hollow and, by way of an appropriately dimensioned aperture 18*d* in hub 18*b*, communicate with the nitrogen source during approximately the top third of each cycle of rotation, so that during such period of their rotation nitrogen can issue from the ends of the arms 18*a*. Both the vial parts are therefore scavenged while they are being conveyed on the spider 18; the guide member 22 ensures that the vial parts do not disengage from the spider arms during scavenging. Disposed below spider 18 is a drip catcher 13*a* over which any remaining drops of liquid drain to surface 13.

When the spider arms 18*a* rotate to a downward orientation, the completely emptied and scavenged vial parts V′, V″ drop off the arms 18*a* and through a funnel-shaped aperture in casing 1 into a waste bag 23. For safety reasons a nitrogen atmosphere is maintained in casing 1 by way of a connection 24. Some other relatively inert gas could, of course, be used instead of nitrogen.

The apparatus according to the invention is not, of course, limited just to the emptying of vials but is also of use in a similar way for other receptacles which are to be disposed of in relatively large quantities.

We claim:

1. Apparatus for emptying disposable receptacles, comprising:

a. severing means adapted to sever receptacles into two cup-like parts;

b. conveying means for conveying receptacles past said severing means to be severed;

c. a rotating spider which has tubular arms for supporting cup-like parts from the conveyor and which is rotatable about a substantially horizontal axis, the arms being adapted to be connected to a pressure gas source at least during part of each rotation;

d. means to turn the two parts of each receptacle in the conveying means so that the severed apertures of such parts face towards the spider;

e. means for locating each of the receptacle parts thus turned on to a rising spider arm;

f. means for collecting liquid poured out of the receptacles; and g. separate means for collecting cup-like parts.

2. Apparatus as claimed in claim 1, wherein the conveying means comprises a pair of conveying discs, a substantially horizontal shaft on which the discs are mounted; and a stationary guide member which extends over part of the conveying disc periphery and which serves to retain the receptacles or the severed parts thereof in the conveying means; wherein the discs define receptacle-receiving recesses in their periphery having axes that are parallel to the shaft, and wherein the severing means is a disc which extends into the gap between the two conveying members and through a gap formed in the guide member.

3. Apparatus as claimed in claim 2, including a feed shaft and a second pair of conveying discs preceding the first pair and similar thereto, wherein the feed shaft is adapted to supply receptacles to the recesses in the second pair of conveying discs.

4. Apparatus as claimed in claim 2, wherein the means for turning the severed parts of the receptacles comprise two pairs of guiding surfaces, and wherein each pair is disposed on both sides of one disc of the first pair of conveying discs and extend along the arcuate movement path of the receptacle parts, and cooperate with one another to form one guide each for such parts, such guide extending sinuously in the direction of conveyance so as to turn gradually through an angle of from 45° to 90°.

5. Apparatus as claimed in claim 4, wherein the means for turning the severed parts of the receptacles comprise two further pairs of guiding surfaces, one each of which is substantially at right angles to one of the previously mentioned guiding surfaces and extends sinuously through the same angle as the latter in the direction of conveying, so that a pair of said first-mentioned and said second-mentioned guiding surfaces form a guide which engages around a receptacle part.

6. Apparatus as claimed in claim 2, wherein the spider arms are disposed in pairs in two planes axially offset from one another by the distance between the two discs of the pair of discs of the conveying means; and wherein the guide member terminates after the lowest point of the discs, and wherein the spider is positioned for a rising pair of arms to engage a pair of receptacle parts at the end of the guide member during operation of the apparatus.

7. Apparatus as claimed in claim 1, including a casing enclosing at least the conveying means and the severing means, the casing being adapted to be connected to an inert gas source whereby it may be filled with an atmosphere of inert gas.

8. Apparatus as claimed in claim 1, including control means coupled to the means for collecting the liquid, the control means being adapted to stop the conveyance of receptacles whenever the means for collecting the liquid has filled up to a predetermined level.

9. Apparatus as claimed in claim 8, wherein the control means comprise a balance adapted to support a collecting vessel, and which operates a switch in response to the predetermined loading and thus stops the conveying means.

* * * * *